UNITED STATES PATENT OFFICE.

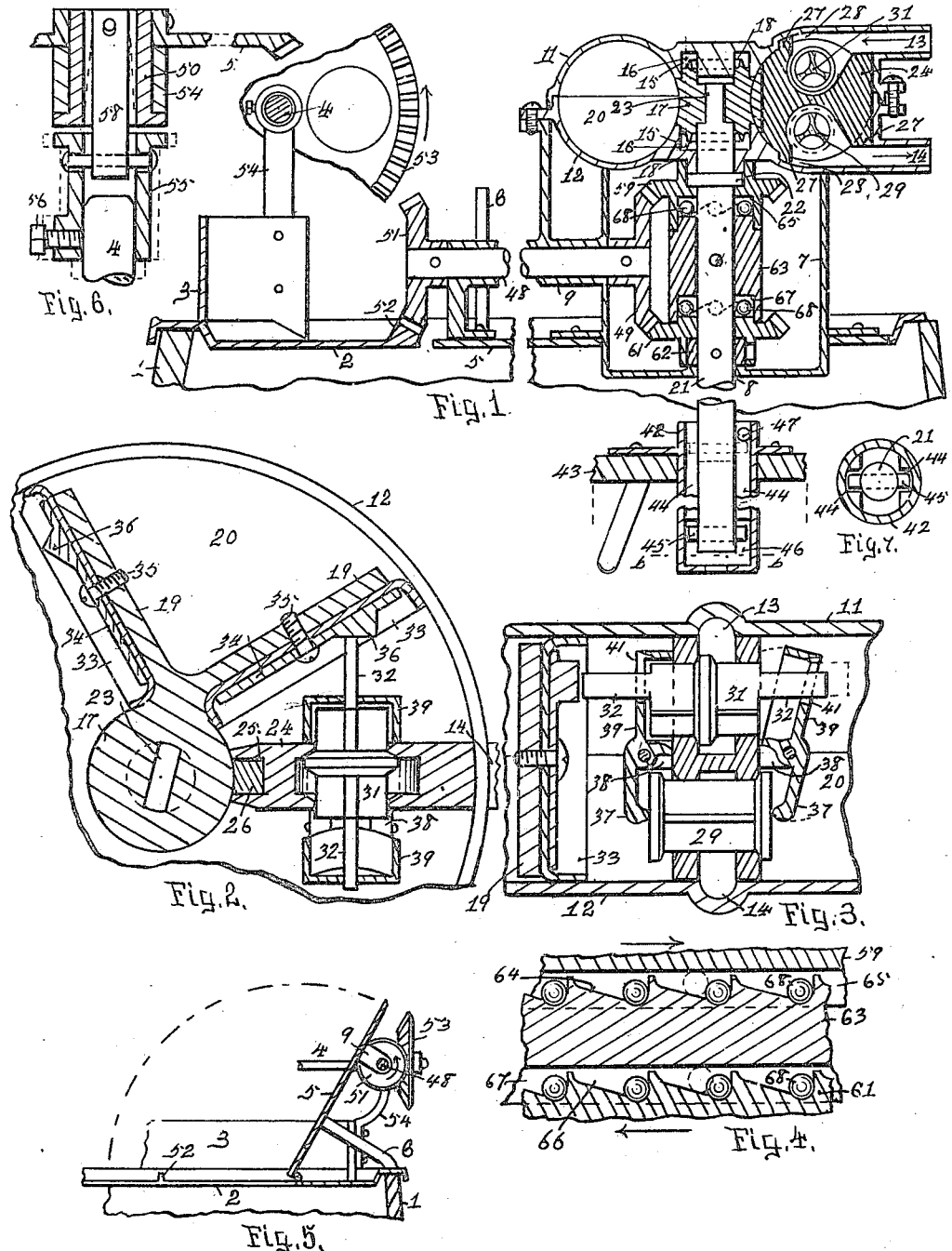

ROBERT S. CARR, OF OXFORD, OHIO.

HYDRAULIC MOTOR.

1,031,911.     Specification of Letters Patent.     Patented July 9, 1912.

Application filed August 22, 1910. Serial No. 578,320.

*To all whom it may concern:*

Be it known that I, ROBERT S. CARR, a citizen of the United States, residing at Oxford, Ohio, have invented a new and useful Improvement in Hydraulic Motors, of which the following is a specification.

My invention relates to hydraulic motors of the class adapted for operating washing machines or wringers or for other suitable purposes, and the objects of my improvements are to journal the piston in bearings formed in the casing and independently of the main shaft for preventing it from binding in its bearings; to provide means for utilizing the water pressure for unseating and shifting the discharge valve; to provide automatic clutch and gear mechanism for translating alternating into direct rotative motion; to provide means for moving the motor with the main shaft into different vertical angles for automatically engaging and disengaging the clutch and gear mechanism and also for detachably engaging a shaft journaled in a fixed position; to provide a fixed stop for detachably engaging with and preventing the crawling of the secondary shaft when out of action; to provide automatic means for disengaging a splined cover for the main shaft; from being rotated thereby, and to provide simple and durable construction and assemblage of the various members for securing facility of operation and efficiency of action. These objects are attained in the following described manner as illustrated in the accompanying drawings, in which:—

Figure 1 is a vertical diametrical section of a hydraulic motor embodying my improvements; Fig. 2 a plan with parts broken away; Fig. 3 a vertical section on the axis of the valves; Fig. 4 a diagram in section of the ball clutches; Fig. 5 a vertical section of the hinged member for moving and maintaining the motor with the main shaft in different vertical angles. Fig. 6 a horizontal section of the toggle joint connections with the wringer shaft, and Fig. 7 a section on the line *b—b* of Fig. 1.

In the drawings, 1 represents the tub of a washing machine, 2 a metal cover thereon formed with a wringer bracket 3 whereon a wringer with its shaft 4 may be removably secured. A lid 5 removably hinged on the cover may be maintained in a predetermined vertical angle by the contact of the projecting lug 6 thereon with the cover. A bed plate 7 secured on lid 5 is formed with an axial bearing 8 and with a lateral bearing 9. The motor removably secured on said bed plate consists of similar top and bottom members 11 and 12 removably secured together in the ordinary manner and formed with respective inlet and discharge passages 13 and 14. Each of said members is also formed with an axial bearing 15 and with an annular packing groove 16 concentric therewith.

A piston 17 journaled in bearings 15 is formed on its ends with annular thin projections 18 adapted to be compressed partially within the packing in grooves 16 for preventing leakage. Said piston is also formed with arms 19 adapted to project radially within the annular cylinder 20 which is preferably circular in cross section. The main shaft 21 formed with a collar 22 may be journaled in bearing 8 and splined in an axial slot 23 formed in the piston. A cylindrical housing 24 is formed with a tangential slot 25 adjacent to the piston for the reception of the packing 26 and also formed with projecting lugs 27 adapted to detachably engage with recesses 28 formed on the inside of the members of the casing, whereby said housing may be removably secured within the casing to form a water tight partition across the cylinder 20. Said housing is provided with the usual balanced discharge valve 29 and also with the balanced inlet valve 31 which is formed with extensions 32 of the ends of its stem.

Cup packings 33 may be secured on the respective arms 19 of the piston by means of the clamping plates 34 and screws 35. Said plates are each formed with a boss 36 for unseating the inlet valve by contacting with the corresponding extension 32 of the stem thereof. Levers 37 may be trunnioned in bearings 38 on opposite sides of the housing 24 with one end terminating in engagement with the corresponding end of the discharge valve 29. The other end of said levers terminate in cup shaped closures 39 formed with slots 41 for the movement therethrough of the extensions 32 of the stems of the inlet valve. Said closures may be actuated in one direction by the movement of the discharge valve to alternately cover the stems of the inlet valve and obstruct the corresponding inlet port thereof. The discharge of the water under pressure through the inlet port after the inlet valve is unseated therefrom serves to actuate the corresponding closure to uncover said port and also to unseat and shift the discharge valve.

A tubular member 42 provided with a dolly 43 serves to cover the lower portion of the main shaft and prevent it from injuring the clothes in the tub. Said member is formed with interior longitudinal grooves 44 whereby it is splined on the main shaft by means of the transverse pin 45 therein. Said grooves terminate in a chamber 46 formed within the lower end of said member for the movement therein of said pin after it is disengaged from the grooves by the movement of the dolly into contact with the bed plate. A transverse pin 47 in the upper portion of member 42 serves to intercept one end of pin 45 to prevent the removal of said member from the main shaft.

A secondary shaft 48 journaled on the bed plate in bearing 9 is provided on one end with pinion 49 and on the other end with a pinion 51 which is adapted to engage with a fixed stop 52 on the cover when the lid is closed for preventing said shaft from turning. When the lid is opened as shown in Fig. 5 said pinion engages with gear 53 which is secured on a hollow spindle 50 whereby it is journaled in bracket 54. A socket 55 provided with a set screw 56 for securing the wringer shaft 4 therein is connected with the spindle 50 by means of the toggle pin 58 in such manner that the wringer shaft may be rotated thereby when out of alinement with the axis of gear 53.

Idle gears 59 and 61 are idly mounted on the main shaft between the collars 22 and 62 and in continuous engagement with the pinion 49 on shaft 48. A sleeve 63 secured on the main shaft between said idle gears thereon is formed on one end with a series of inclined lugs 64 to project within the annular channel 65 formed in the adjacent end of gear 59. A series of similar inclined lugs or teeth 66 formed on one end of gear 61 project within the similar annular channel 67 formed in the adjacent end of said sleeve. Gravity metal balls 68 are disposed within said annular channels and between the adjacent said lugs therein, as shown in Figs. 1 and 4.

In operation, water admitted under pressure through one of the inlet ports to the interior of the cylinder serves to turn the piston and unseat the inlet valve from the opposite inlet port by contact with the corresponding extension of its stem. The water thus admitted under the valve through the inlet port just opened forces the lever with the corresponding closure to uncover said port and simultaneously unseat and shift the discharge valve. This movement of the discharge valve moves the other lever with its closure to shut the former inlet port. During the almost instantaneous shifting of the discharge valve the reversal of the direction of the water toward the now opened discharge port acts as a "water hammer" for completing the shifting of the unseated inlet valve. This action of the valves admits the water to the interior of the cylinder on the opposite side of the housing for turning the piston in the opposite direction and reversing the valves in the same manner, whereby alternating rotative motion of the piston with the main shaft may be continued.

When the lid is opened as shown in Fig. 5 with the main shaft in a predetermined vertical angle and with the pinion 51 in engagement with gear 53, one or more of the gravity balls in one of the channels engages the corresponding idle gear to turn with the shaft in one direction and when the shaft is turned in the opposite direction said idle gear is disengaged and the other idle gear thereon is engaged by one or more of the balls in the other channel to turn with the shaft whereby continuous rotary motion may be imparted through the gears to the secondary shaft and thence to the wringer shaft.

With the lid in the open position as shown in Fig. 5 the vertical angle of the main shaft permits the splined member thereon to slide by gravity toward the bed plate with the pin 45 disengaged from the grooves 44 and free to turn in the chamber 46. When the lid is closed said member by gravity becomes reëngaged to turn with the main shaft and the engagement of pinion 51 with the stop 52 locks the secondary shaft from creeping and the balls resume their normal positions with the idle gears remaining unmoved by the rotative movement of the main shaft.

Having fully described my improvements, what I claim as my invention and desire to secure by Letters Patent of the United States is:—

1. A motor comprising an inlet valve, a movable member for obstructing the port thereof and adapted to retain pressure therein, and means independent of said member and engaged by the piston for unseating the valve.

2. A motor comprising inlet and discharge valves, means actuated by the discharge valve for obstructing the inlet port, and means for unseating the inlet valve.

3. A motor comprising a housing provided with inlet and discharge valves, and a member movably secured thereto for obstructing the inlet port and for unseating the discharge valve.

4. A motor comprising inlet and discharge valves, and a member fulcrumed at a fixed point for obstructing the inlet port and for shifting the discharge valve.

5. A motor comprising a housing provided with inlet and discharge valves, a member fulcrumed thereon and actuated by the water pressure for shifting the discharge valve.

6. A motor comprising an inlet valve formed with an extension of its stem, a closure for the port thereof and formed with a slot for the movement of said extension therethrough, and means for unseating said valve by contact with said extension.

7. A motor comprising inlet and discharge valves, a member fulcrumed at a fixed point in relation thereto for obstructing the inlet port and for shifting the discharge valve, and means for unseating the inlet valve.

8. The combination of a gear journaled in a fixed bearing, a shaft, toggle connections between the gear and shaft, and driven connections for detachably engaging with the gear.

9. The combination of a fixed bearing, a driven tubular journal therein, a socket adapted to receive the end of a shaft, and a toggle pin movably secured at one end within the journal and movably secured at its other end to the socket, whereby the shaft may be driven by the journal when out of alinement therewith.

10. A motor comprising a casing formed with a packing chamber, a member formed with a hub whereby it may be journaled in said chamber, the end of said hub being formed with a circular projection adapted to engage with the packing within said chamber.

11. A motor comprising a casing formed with a packing chamber, a piston journaled in said chamber and terminating at its end in a concentric V shaped circular projection adapted to penetrate the surface of the packing within the chamber.

12. A motor comprising a casing formed with radial inlet and discharge openings and inclosing an annular chamber, and a valve housing formed with lugs adapted to engage with the respective openings for removably securing said housing within the chamber and in registration with said openings.

13. The combination of an alternately rotative driven shaft, a secondary shaft idly geared thereto, and clutch mechanism for imparting direct rotative motion to the latter from the former shaft, said clutch mechanism being arranged to be automatically engaged or disengaged by the movement of the former shaft into different vertical angles.

14. The combination of a hinged member, a driven shaft movable thereby into different vertical angles, a fixed sleeve and an idle gear on the shaft, the one being formed with a series of inclined lugs adjacent to the other, gravity balls arranged to automatically engage the gear with the sleeve at a predetermined angle of the shaft, and a secondary shaft driven by the gear.

15. The combination of a hinged member, a shaft movable therewith in different vertical angles, means for imparting alternating rotative motion thereto, idle gears on the shaft, a secondary shaft actuated thereby, and clutch mechanism arranged for automatically engaging the gears alternately with the shaft when the shaft is moved into a predetermined vertical angle.

16. A motor comprising a main shaft and mounted on a hinged member, a secondary shaft, gears and clutch mechanism arranged to detachably engage the main shaft therewith, a third shaft journaled in fixed bearings, gears adapted to detachably engage the secondary shaft therewith, whereby the secondary and the third shaft may be simultaneously actuated by the main shaft when the hinged member is moved in a predetermined vertical angle.

17. The combination of a main shaft, means for imparting alternating rotative motion thereto, idle gears on the main shaft, a secondary shaft actuated thereby, gravity clutches for alternately engaging the idle gears with the main shaft, and means for moving the main shaft in different vertical angles for automatically actuating the clutches.

18. The combination of a shaft movable in different vertical angles, a fixed sleeve and idle gears thereon, gravity balls arranged to engage the gears alternately with the sleeve at a predetermined vertical angle of the shaft, means for imparting alternating rotative motion to the shaft, and a secondary shaft provided with a gear in continuous engagement with the idle gears.

19. The combination of a main shaft, means for imparting alternating rotative motion thereto, a secondary shaft, idle gears on the main shaft engaging therewith, a third shaft journaled in fixed bearings, gears detachably engaging the secondary shaft therewith, gravity clutches arranged to alternately engage the idle gears with the main shaft, and a hinged member for moving the main shaft in a predetermined vertical angle for simultaneously engaging and actuating the clutches and engaging the secondary with the third shaft.

20. The combination of a hinged member, a motor mounted thereon and provided with an alternating rotative main shaft, of a fixed clutch member mounted on said shaft, idle clutch members for coöperating therewith also mounted on said shaft, and gravity balls for alternately engaging said idle clutch members to turn with the fixed clutch member in corresponding reverse movements of the shaft when said hinged member is moved with the shaft into a predetermined vertical angle.

21. The combination with a hinged support, of a motor mounted thereon, a rotatively reciprocating shaft driven by the motor, a member on said shaft mounted to move longitudinally thereof and to remain idle thereon at a predetermined point, and means for engaging said member with said shaft for movement thereby at another predetermined point.

22. The combination with a hinged support, of a motor shaft mounted on said support and movable therewith, a gear on said shaft, a coöperating gear located at a fixed point for engagement by the former gear when the support is swung on its hinge to a predetermined position, and a stop located at another fixed point for engagement with the swinging gear when the latter is moved with the hinged support into another predetermined position.

23. The combination with a hinged support, of a rotatably reciprocating shaft mounted thereon and movable therewith into different angles, of another shaft so mounted as to be driven from the first shaft, and intermediate gear clutch mechanism for operatively connecting said shafts, said mechanism being adapted to be thrown into action by the angular movement of said rotatively reciprocating shaft.

ROBERT S. CARR.

Witnesses:
SAMUEL CARR,
M. E. ALLENDORF.